(12) United States Patent
Cobb et al.

(10) Patent No.: US 7,310,064 B2
(45) Date of Patent: Dec. 18, 2007

(54) REBROADCASTING METHOD AND SYSTEM FOR NAVIGATION SIGNALS

(75) Inventors: H. Stewart Cobb, Palo Alto, CA (US); David G. Lawrence, Mountain View, CA (US)

(73) Assignee: Novariant Inc., Fremont, CA (US)

( * ) Notice: Subject to any disclaimer, the term of this patent is extended or adjusted under 35 U.S.C. 154(b) by 105 days.

(21) Appl. No.: 10/837,515

(22) Filed: Apr. 29, 2004

(65) Prior Publication Data
US 2005/0242994 A1   Nov. 3, 2005

(51) Int. Cl.
*G01S 1/08* (2006.01)
*G01S 5/14* (2006.01)

(52) U.S. Cl. .................. 342/386; 342/357.06
(58) Field of Classification Search ............. 342/386, 342/357.06, 357.08
See application file for complete search history.

(56) References Cited

U.S. PATENT DOCUMENTS

| | | | |
|---|---|---|---|
| 5,119,102 A | | 6/1992 | Barnard |
| 5,274,545 A | | 12/1993 | Allan et al. |
| 5,345,244 A | | 9/1994 | Gildea et al. |
| 5,379,224 A | | 1/1995 | Brown et al. |
| 5,438,337 A | * | 8/1995 | Aguado .............. 342/357.08 |
| 5,583,513 A | * | 12/1996 | Cohen ................. 342/357.06 |
| 5,708,440 A | * | 1/1998 | Trimble et al. ....... 342/357.06 |
| 5,729,235 A | * | 3/1998 | Guthrie et al. ....... 342/357.12 |
| 5,784,028 A | | 7/1998 | Corman et al. |
| 5,886,665 A | * | 3/1999 | Dosh et al. ............... 701/213 |
| 6,961,367 B2 | * | 11/2005 | Simic et al. .............. 375/214 |
| 7,062,224 B2 | * | 6/2006 | Baker et al. .................. 455/9 |
| 2003/0008669 A1 | * | 1/2003 | Stein et al. .............. 455/456 |
| 2003/0058163 A1 | * | 3/2003 | Zimmerman et al. .. 342/357.08 |

FOREIGN PATENT DOCUMENTS

GB  2353648 A  * 2/2001

OTHER PUBLICATIONS

Cobb, H. Stewart, "GPS Pseudolites: Theory, Design and Applications," A Dissertation for the Degree of Doctor of Philosophy, Sep. 1997. pp. 1-151.*
LeMaster, Edward Alan, "Self-Calibrating Pseudolite Arrays: Theory and Experiment," A Dissertation for the Degree of Doctor of Philosophy, May 2002, pp. 1-170.*
Stone, Jonathan, "GPS Pseudolite Transceivers and Their Applications," ION, National Tech Meeting, Jan. 1999, 10 pages.*
"Real-Time Missile Tracking With GPS," by Lawrence L. Wells, pp. 105-111, Apr. 1981.
"GPS Pseudolites: Theory, Design, and Applications (A Dissertation Submitted 1981 to the Department of Aeronautics and Astronautics and the Committee of Graduate Studies of Stanford University)", by H. Stewart Cobb; dated Sep. 1997; pp. 13-41.

* cited by examiner

*Primary Examiner*—Gregory C. Issing
(74) *Attorney, Agent, or Firm*—Brinks Hofer Gilson & Lione

(57) ABSTRACT

A "synchrolite" or rebroadcasting device allows GPS or GNSS navigation signals received at one or several locations to be processed at a separate location. The signals received by the synchrolite are added to a pilot tone and then encoded with a superimposed spread-spectrum code before being rebroadcast. The superimposed code allows signals from different synchrolites to be distinguished during the navigation process.

23 Claims, 4 Drawing Sheets

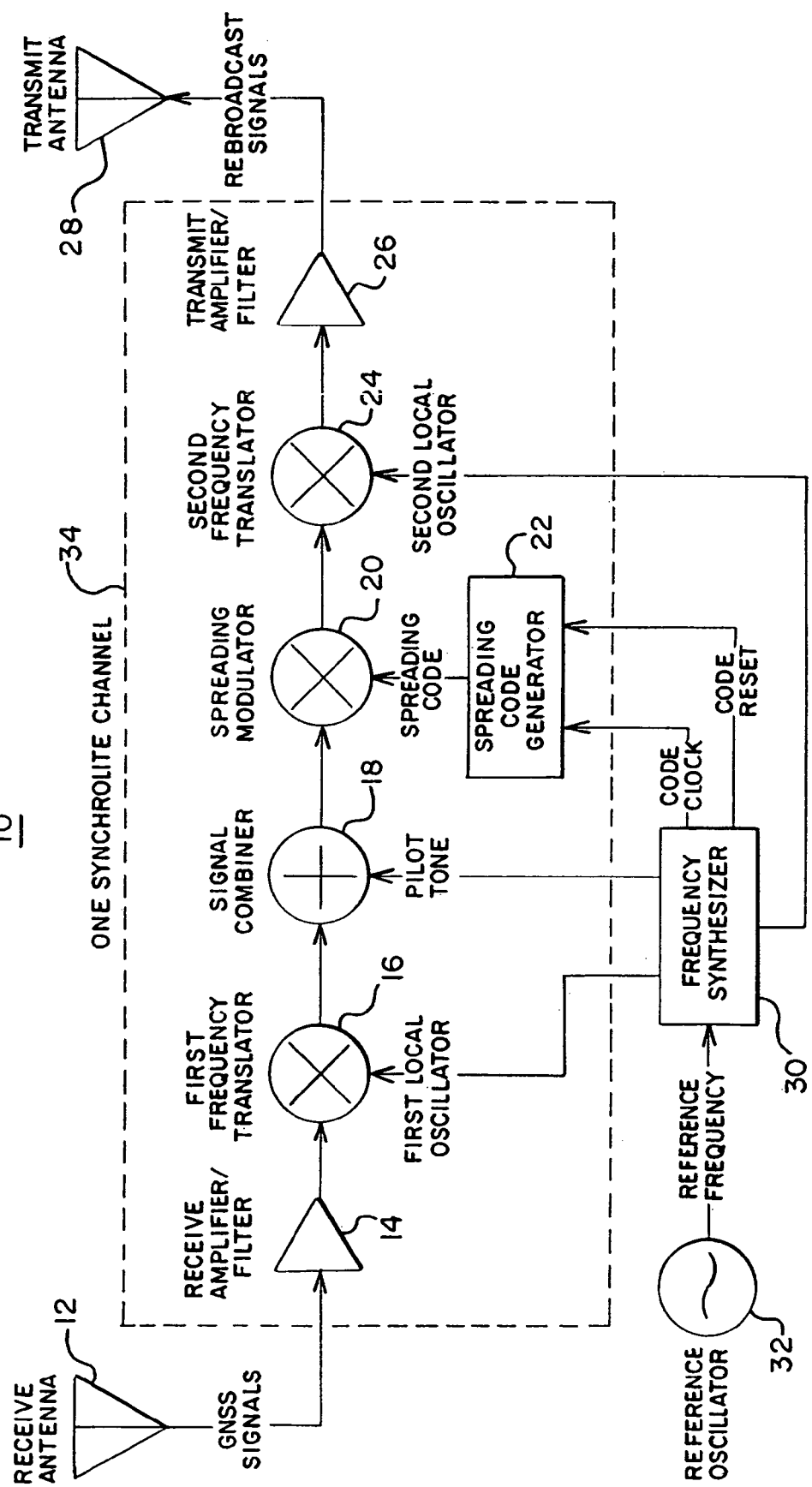

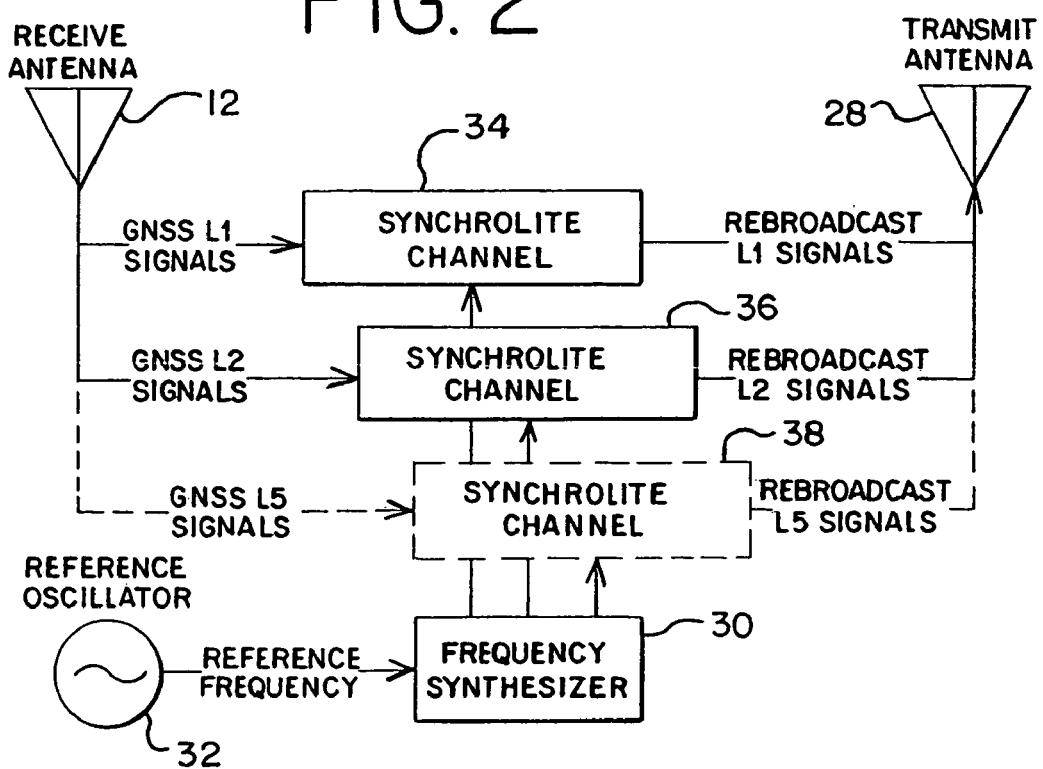
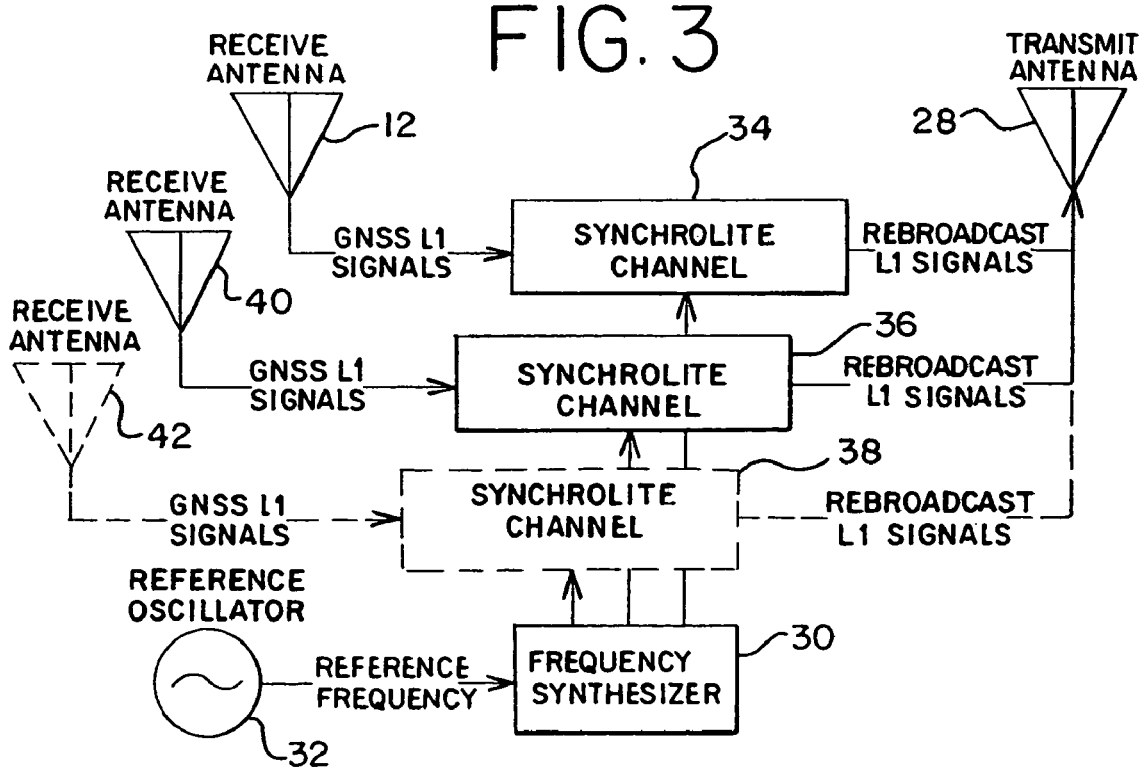

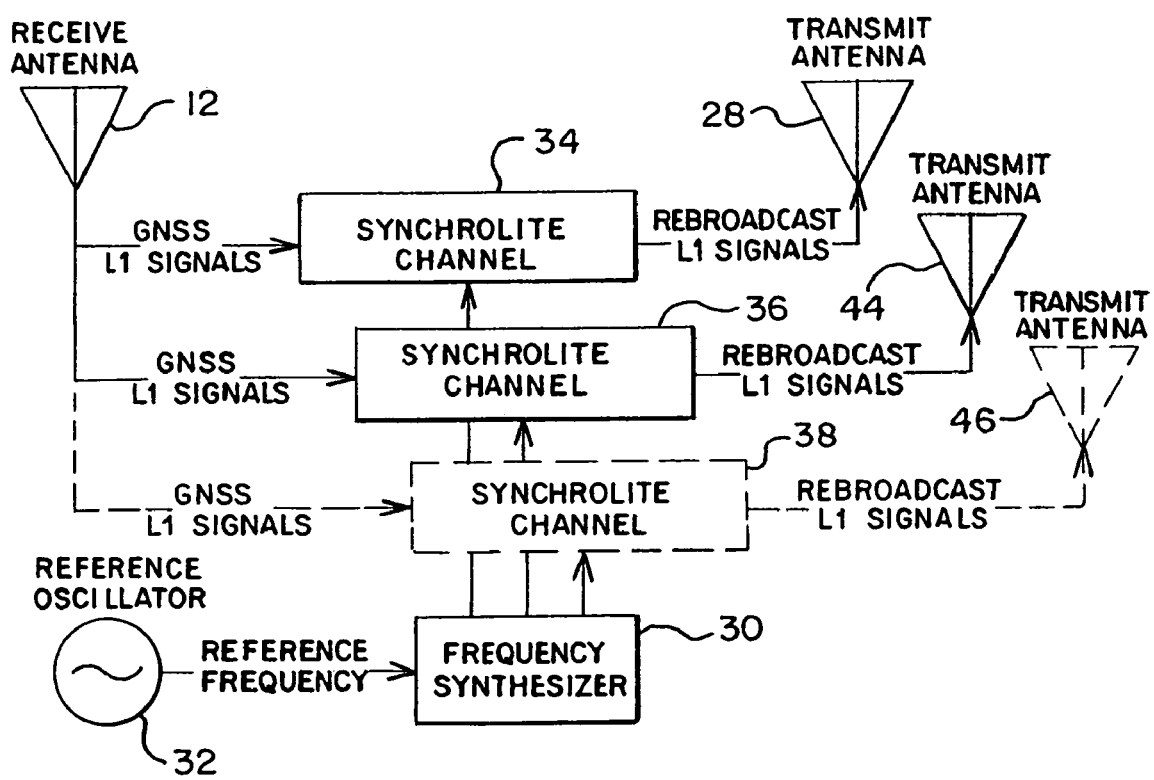

REBROADCASTING METHOD AND SYSTEM FOR NAVIGATION SIGNALS

BACKGROUND

This present invention relates generally to global navigation satellite systems (GNSS), such as the American global positioning system (GPS), the Russian Glonass system, and the European Galileo system. It relates specifically to synchrolites (i.e., frequency translators or rebroadcasters) for use with navigation signals from such GNSS systems.

GNSS systems can be used in a "stand-alone" mode to compute the position of a single antenna, or in a "differential" mode to compute the relative positions of two or more antennas. In conventional systems, each antenna is directly connected to a navigation receiver. It is occasionally desired to break this direct connection and separate the antenna from the navigation receiver. In such cases, the signals received by the antenna are transmitted over a separate communications link to the navigation receiver. This separate communications link has traditionally been a separate radio frequency, but it could alternatively be an acoustic or optical link (see U.S. Pat. No. 5,345,244). When a separate radio frequency was used, the original receiver or antenna side of the link is often called a "frequency translator" or "rebroadcaster."

Frequency translators were first used in the early days of the American GPS program. In the late 1970's, various agencies desired to flight-test missiles and track them with GPS accuracy, but the existing GPS receivers were too large and heavy to fit inside a missile. The solution was a device (called a "GPS translator" at the time) which received signals in the GPS frequency band and retransmitted them in a telemetry frequency band from the missile to a navigation receiver on the ground, such as disclosed in U.S. Pat. No. 5,729,235.

These frequency translators had at least one local oscillator which is independent of the GPS satellite system clocks. The frequency translation is accomplished by mixing in a radio frequency mixer the local oscillator frequency with the signals received through the antenna, producing translated signals at a new frequency. The apparent frequencies of the GPS signals from the perspective of the navigation receiver on the ground are the sum or difference of the actual GPS frequencies with the frequency of the local oscillator on board the missile. To improve the navigation accuracy, a signal known as a "pilot tone" was added to the output of the translator in the same band as the translated GPS signals. The pilot tone was derived from the local oscillator in such a way that the respective frequencies had a fixed mathematical relationship. Spread spectrum pilot tones have been suggested. The navigation receiver on the ground then measured the frequency of the pilot tone, computed the frequency of the translator's local oscillator using the known mathematical relationship, and adjusted the received frequencies of the translated GPS signals to remove the effect of the translator's local oscillator.

BRIEF SUMMARY

The present invention is defined by the following claims, and nothing in this section should be taken as a limitation on those claims. By way of introduction, the preferred embodiments described below includes a method and systems for rebroadcasting radio signals and/or receiving rebroadcast radio signals, such as ranging signals. Ranging signals are defined herein as radio signals containing features which can be measured by a properly designed receiver to determine a quantity related to the distance or "range" between the transmitter and such a receiver, or between two such receivers. Other applications include rebroadcasting a band of radio frequency signals, such as cellular telephone signals, from a remote location to a more developed location.

In one aspect, ranging signals are received, modulated with a spreading code and rebroadcast. For example, a frequency translator or rebroadcaster for GNSS signals modulates with a spreading code so that several different sets of GNSS signals may be rebroadcast in the same frequency band at the same time using code division multiple access (CDMA) techniques. Each channel of a synchrolite receives signals in a given GNSS band through a given antenna, shifts or translates those signals to another frequency band chosen for rebroadcast, optionally adds a pilot tone signal, modulates the set of signals with a CDMA spreading code, and then transmits this set of modulated signals through a transmitting antenna. The term "synchrolite" is used to include frequency translators and rebroadcasters as well as similar units with additional features. A single set of GNSS signals may also benefit from modulation with a spreading code and rebroadcast.

in other aspects, a synchrolite may translate GNSS signals originally broadcast in several different frequency bands (such as the L1, L2, and L5 signals of the American GPS system) and rebroadcast them in a single frequency band with the individual sets of signals distinguished by different spreading codes. A synchrolite may receive GNSS signals through several different antennas and rebroadcast them through a same transmit antenna with the signals from individual antennas distinguished by different spreading codes. A synchrolite may receive GNSS signals through a single antenna and rebroadcast them through several different antennas with the signals from individual antennas distinguished by different spreading codes.

In yet another aspect, a receiver for these rebroadcast signals may receive in only one frequency band, such as the rebroadcast frequency band. The ranging, position and/or navigation computations assume that each set of signals received in that band is affected in the same way by imperfections in the receiver.

Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a block diagram of one embodiment of a single-channel system for rebroadcasting signals received in a single GNSS frequency band through a single receiving antenna and a single transmitting antenna;

FIG. 2 is a block diagram of another embodiment of a multiple-channel system for rebroadcasting signals received in multiple GNSS frequency bands through a single receiving antenna and a single transmitting antenna;

FIG. 3 is a block diagram of yet another embodiment of a multiple-channel system for rebroadcasting signals received in a single GNSS frequency band through multiple receiving antennas and a single transmitting antenna;

FIG. 4 is a block diagram of yet another embodiment of a multiple-channel system for rebroadcasting signals received in a single GNSS frequency band through a single receiving antenna and multiple transmitting antennas;

DETAILED DESCRIPTION OF THE DRAWINGS AND PRESENTLY PREFERRED EMBODIMENTS

Figure 5:
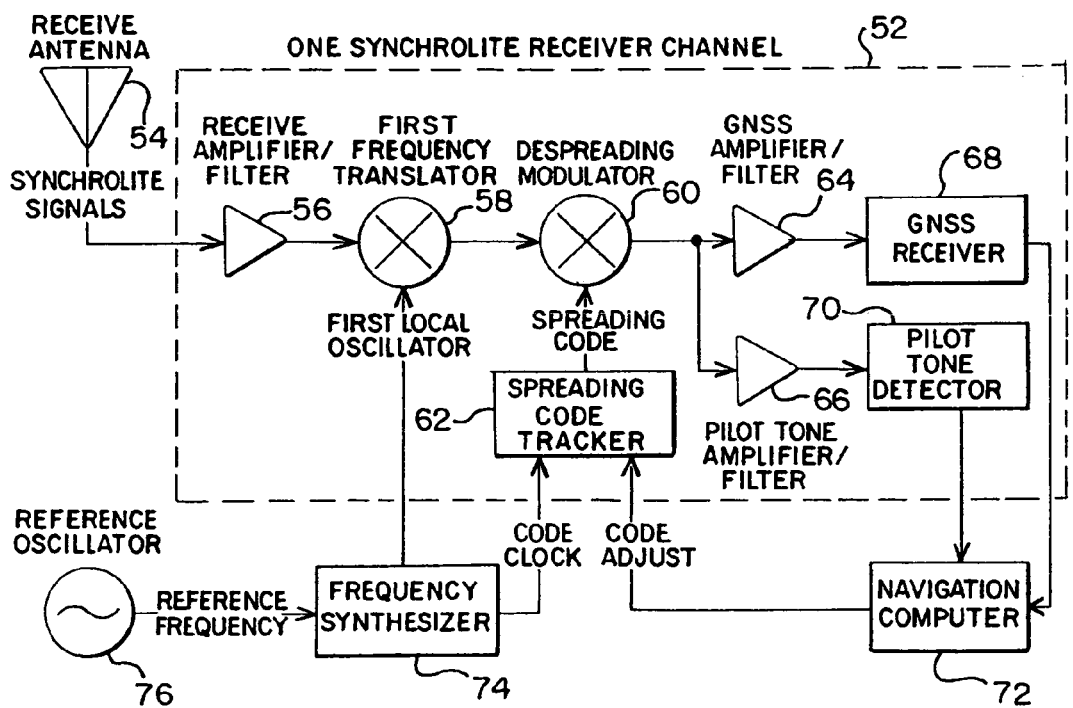
FIG. 5 is a block diagram of one embodiment of a single channel of a ranging receiver for receiving rebroadcast ranging signals.

FIG. 1 shows a system 10 for rebroadcasting ranging signals. The system 10 represents one embodiment of a synchrolite for use in any application in which the relative positions of two points is to be measured. For example, the synchrolite may be fixed with respect to the surface of the earth. A navigation receiver, moving nearby, determines its position relative to the fixed synchrolite. The navigation receiver might be used to survey the locations of various points in the area around the synchrolite, or to control the motion of a vehicle or aircraft relative to a synchrolite placed on a runway, in a garage, or at an arbitrary point of interest. Alternatively, the synchrolite may be moving and the navigation receiver may be fixed. This could be useful if the synchrolite is smaller, lighter, or less expensive than the navigation receiver, or if the navigation data is desired at a fixed point. Applications include tracking people or animals across a large and possibly partly obscured area. Alternatively, both the synchrolite and the navigation receiver may be moving. Such applications include formation flying or driving of several aircraft or vehicles, automatic control of a farm implement or bulldozer blade relative to the tractor or bulldozer to which it is attached, or automatic guidance of an object dropped from an aircraft. Other applications may be used for any of the fixed or moving embodiments discussed above.

The system 10 includes a receive antenna 12, a receive amplifier and/or filter 14, a frequency translator 16, a signal combiner 18, a modulator 20, a spreading code generator 22, another frequency translator 24, a transmit amplifier and/or filter 26, a transmit antenna 28, a frequency synthesizer 30 and a reference oscillator 32. Additional, different or fewer components may be used, such as having only one or no frequency translators 16, 24, having no signal combiner 18, having no amplifiers 14 and/or 26 and combinations thereof. The system 10 is a single-channel synchrolite in one embodiment. The dotted lines at 34 represent the single synchrolite channel. For use with multiple channels, the reference oscillator 32 and frequency synthesizer 30 are common to all or a sub-set of channels within a given synchrolite.

The receive antenna 12 is a GPS antenna, such as the Andrew 40 series, a microwave antenna, or other now known or later developed antenna for ranging signals. Ranging signals broadcast by a GNSS system or a land-based transmitter, such as spread spectrum or code division multiplexed signals, are received by the receive antenna 12. In one embodiment, the receive antenna 12 and transmit antenna 28 are part of the same physical antenna structure, constructed so that the phase centers of the receive and transmit antennas 12, 28 are aligned as closely as possible. The receive and transmit antennas are constructed so that the received signals appear to be received at virtually the same point in space as the transmitted signals are transmitted from, but other non-aligned arrangements may be used.

The receive amplifier and/or filter 14 is a low-noise amplifier and a separate filter appropriate for the frequencies of interest, such as the L1, L2 or L5 frequencies of the American GPS system. Amplification without filtering or filtering without amplification may be used. Other amplifiers and/or filters may be used.

The frequency translator 16 is a mixer or multiplier connected with the modulator 20. "Connected with" includes direct or indirect connection. In one embodiment, the frequency translator 16 is a diode-ring mixer, but other now known or later developed frequency translators may be used. The frequency translator 16 is operable to shift in frequency the ranging signals from the receive antenna 12. The ranging signals are shifted in frequency to any convenient intermediate frequency band, such as a band 20 MHz wide centered on 175 MHz, using a local oscillator signal. In one embodiment, both frequency translators 16 and 24 are used. In a simplified embodiment, either frequency translator 16, 24 may be omitted, making the intermediate frequency band within the synchrolite channel 34 the same as either the received or transmitted frequency band.

The signal combiner 18 connects between the receive antenna 12 and the modulator 20. The signal combiner 18 is a microstrip quadrature hybrid, summer, common electrical node or other now known or later developed combiner for summing two signals together. The signal combiner 18 is operable to combine the ranging signals with a pilot tone. The pilot tone is provided by the frequency synthesizer 30 at a frequency within or near the intermediate frequency band. The pilot tone is added to the intermediate frequency signals by the signal combiner 18. In a simplified embodiment, the pilot tone and signal combiner 18 are skipped or omitted.

The modulator 20 connects with the receive antenna 12 to receive ranging signals. The modulator 20 is a mixer, multiplier, a spreading modulator, a diode-ring mixer or other now known or later developed modulator. In one embodiment, the modulator 20 is a digital modulator, such as a binary phase shift keying (BPSK) modulator, quadrature phase shift keying (QPSK) modulator, m-phase shift keying (mPSK), or quadrature amplitude modulator (QAM). The modulator 20 is operable to modulate ranging signals from the receive antenna 12 with a spreading code. For example, the modulator 20 modulates the combined ranging and pilot tone signals at the intermediate frequency with the spreading code.

The spreading code generator 22 generates a repeatable stream or sequence of digital or analog voltages or values known as "chips". In one embodiment, the spreading code generator 22 is a combination of one or more linear feedback shift registers (LFSR) and each code "chip" is a set of one or more digital bits. Other configurations of components or a single register may be used. The "C/A-code" and "P-code" generators used in the American GPS system are examples of one type of spreading code generator 22 in which each code chip is a single digital bit and the spreading code modulator 20 is a BPSK modulator. In one embodiment, the spreading code generator 22 is a field-programmable gate array. The spreading code generator creates a stream of code "chips," usually in the form of digital bits or groups of bits. The stream is of a fixed pattern of code chips. At each event of the spreading code clock signal, the next code chip in the pattern is selected and output by the spreading code generator. When the end of the pattern is reached, the spreading code generator starts again at the beginning of the pattern.

An event on the spreading code reset signal may also cause the spreading code generator to restart at the beginning of the pattern. The spreading code repeats at a rate determined by the spreading code clock rate divided by the length of the fixed code pattern.

The frequency translator 24 is a mixer or multiplier connected with the modulator 20. In one embodiment, the frequency translator 24 is a diode-ring mixer, but other now known or later developed frequency translators may be used. The frequency translator 24 is operable to shift in frequency the ranging signals from the modulator 20. The signals (e.g., the originally received GNSS signals and the pilot tone, together modulated by the spreading code) are converted from the intermediate frequency band to the desired transmit frequency band by the frequency translator 24 using a local oscillator signal.

The transmit amplifier and/or filter 26 is a medium power amplifier, a band pass filter or combinations thereof. In one embodiment, separate amplifiers and filters are used, but a combined device may be provided. High pass or low pass filters may be used. Low or high power amplifiers may also be used.

The transmit antenna 28 is a patch antenna and connects with an output of the modulator 20. Other now known or later developed transmit antennas may be used. The transmit antenna 28 transmits or rebroadcasts the ranging signals and pilot tone modulated by the spreading code to any interested receivers.

The bandwidth of the entire signal path or channel 34, including the received ranging signals, the various intermediate frequency signals, and the transmitted signal, is wide enough to convey all or substantially all of the signals transmitted by the GNSS systems, but a less bandwidth may be used. The bandwidth of the signal path from the spreading modulator 20 through the transmit antenna 28 is further wide enough to convey a substantial portion of the spread combined intermediate frequency signal where the portion is sufficient to reliably despread and recover the various signals in the navigation receiver.

The reference oscillator 32 is a crystal oscillator, such as an ovenized crystal oscillator. Other now known or later developed oscillators may be used. The reference oscillator 32 generates a signal at any convenient reference frequency, such as 10.000 MHz. The oscillating output of the oscillator 32 is provided to the frequency synthesizer 30 for use by the channel 34. Separate oscillators are used in other embodiments.

The frequency synthesizer 30 is a group of phase-locked-loop oscillator modules, but other frequency dividers or multipliers may be used. The frequency synthesizer 30 generates the local oscillator signals at different frequencies for the frequency translators 16 and 24, the pilot tone signal, and/or the clock and reset signals for the spreading code generator.

A microcontroller controls operation of the synchrolite or channel 34. For example, the microcontroller programs the phase-locked-loop modules of the frequency synthesizer 30 and initializes other components, such as the field programmable gate array of the spreading code generator.

FIG. 1 also represents the method for rebroadcasting ranging signals. The blocks for FIG. 1 represent a process that uses the same or different components than discussed above. Ranging signals are received, such as receiving ranging signals from a GNSS satellite, a satellite-based GNSS augmentation service such as WAAS or EGNOS, or a land-based transmitter. The ranging signals are within at least one frequency band. After any filtering and amplification, the frequency of the ranging signals is optionally shifted prior to modulation with a spreading code. The intermediate frequency ranging signals are combined with a pilot tone prior modulation with the spreading code. The pilot tone may be modulated to include information, such as status or operational information of the channel 34. The combined ranging signals and pilot tone are modulating with a spreading code. The modulated signals are shifted in frequency to a transmit frequency. After any amplification and/or filtering, the modulated spread signals are transmitted. The transmission is either continuous or intermittent. A navigation receiver receives the rebroadcast ranging signals and determines a range from the transmitted, modulated spread signals. The information may be used to determine a distance or position as a function of the rebroadcast signals.

In one embodiment, a feedback loop is used to calibrate the shifting as a function of the received ranging signals. The reference oscillator 32 may contain a GNSS receiver to calibrate the reference frequency as accurately as possible. Techniques for calibrating an oscillator using GNSS signals are known; see for example U.S. Pat. No. 5,274,545, the disclosure of which is incorporated herein by reference. The GNSS receiver processes ranging signals through a signal splitter connected to the receive antenna 12 or to any other receive antennas.

FIG. 2 shows a block diagram of one embodiment of a multiple-channel synchrolite to rebroadcast signals received in multiple GNSS frequency bands through a single receiving antenna 12 and a single transmitting antenna 28. Multiple transmit or receive antennas may be used. Each of the synchrolite channels 34, 36 and 38 include the same components as discussed above for channel 34 of FIG. 1. For example, each channel 34, 36 and 38 includes a modulator operable on ranging signals at different frequency bands, either through shifting to a same intermediate frequency or by operating on signals at different frequencies. In each synchrolite channel 34, 36 and 38, the receive amplifier/filter 14 operates for the frequency band chosen for that channel, and the first and possibly second local oscillator signals for the two frequency translators 16, 24 may have different frequencies related to the frequency band chosen for that channel 34, 36 and 38. Also, the spreading code generator 22 in each channel generates a unique spreading code, so that the signals rebroadcast by the various synchrolite channels 34, 36 and 38 may be distinguished by the navigation receiver. The oscillator 32 and frequency synthesizer 30 are common to all or a sub-set of the channels 34, 36 and 38, but separate oscillators and/or frequency synthesizers 30 may be used for each or sub-sets of channels 34, 36 and 38. Two, three or more separate channels may be used.

Each channel 34, 36 and 38 receives a different GNSS frequency band (e.g., L1, L2 and L5), processes received ranging signals in the manner described in the discussion of FIG. 1, and rebroadcasts the processed ranging signals. The frequency bands received may include signals from other GNSS systems such as the Russian Glonass or the European Galileo systems, from augmentation systems such as the American wide area augmentation system (WAAS) and local area augmentation system (LAAS) or the European EGNOS, from pseudolites, or even from systems not originally intended for navigation such as commercial communication or broadcast signals.

The rebroadcast signals from the various channels 34, 36 and 38 are transmitted in the same frequency band, and distinguished by different spreading codes. Alternatively, different or overlapping frequency bands are used. The transmission from each channel 34, 36 and 38 occurs at a same time, but may be divided in time.

The rebroadcasting of multiple GNSS frequency bands is useful for the same reasons that the reception of multiple GNSS frequency bands is useful in conventional GNSS positioning. For example, the use of measurements in different frequency bands can improve the process of determining carrier-phase integer ambiguities in carrier-phase differential GPS (CDGPS) navigation, also called real-time kinematic (RTK) navigation.

In a method of operation, FIG. 2 represents receiving ranging signals in at least two frequency bands, shifting the ranging signals of the at least two frequency bands to a single rebroadcast frequency band, modulating the ranging signals of each frequency band with a different spreading code, and transmitting at a rebroadcast frequency band. The transmitted signals correspond to the ranging signals from each of the at least two frequency bands.

FIG. 3 shows one embodiment of a multiple-channel synchrolite to rebroadcast signals received in a single GNSS frequency band through multiple receiving antennas 12, 40 and 42 and rebroadcast with a single transmitting antenna 28. Each of the synchrolite channels 34, 36 and 38 includes the same components as discussed above for channel 34 in FIG. 1. Each channel receives ranging signals through a different receive antenna 12, 40 and 42, processes them in the manner described in the discussion of FIG. 1, and rebroadcasts them. The rebroadcast signals from the various channels 34, 36 and 38 are transmitted in the same frequency band and distinguished by different spreading codes. The modulator 20 of each channel 34, 36 and 38 uses a different spreading code to uniquely identify the ranging signals received at each channel while simultaneously rebroadcasting ranging signals from multiple receive antennas 12, 40 and 42. The filtering and frequency translation are the same in one embodiment, but may be different as a function of channel 34, 36 and 38 in other embodiments. While the number of synchrolite channels shown in this figure is three, any useful number of antennas and channels may be used.

Multiple receive antennas 12, 40 and 42 in a single synchrolite may be valuable for the same reasons that multiple antennas connected to a single navigation receiver are valuable. For example, the relative positions of the various antennas may be determined with great accuracy. If the antennas are rigidly connected to a rigid body, the orientation of that body in space may be determined as well as position.

Although FIG. 3 shows a synchrolite which rebroadcasts the L1 frequency band of the American GPS system, other, any or all of the frequency bands discussed herein may be used. Any of the receive antennas 12, 40 and 42 may be a multi-band antenna, and the corresponding synchrolite channel 34, 36, and 38 is replaced by a multiple-band synchrolite of the type shown in FIG. 2.

In a method of operation, FIG. 3 represents receiving ranging signals with a plurality of receive antennas, modulating the ranging signals of each of the plurality of receive antennas with a different spreading code, shifting the ranging signals to a rebroadcast frequency band, and transmitting signals responsive to each of the different spreading codes from a single antenna. The received ranging signals are at a same frequency band for each of the plurality of the receive antennas. The transmission at the rebroadcast frequency band of the modulated ranging signals for each receive antenna is performed simultaneously or at a same time, but may be performed sequentially.

FIG. 4 shows one embodiment of a multiple-channel synchrolite to rebroadcast ranging signals received in a single frequency band through a single receiving antenna 12 and multiple transmitting antennas 28, 44 and 46. Each of the synchrolite channels 34, 36 and 38 is the same as the synchrolite channel 34 discussed above for FIG. 1. Each channel 34, 36 and 38 receives ranging signals through the same receive antenna 12, processes them in the manner described in the discussion of FIG. 1, and rebroadcasts the ranging signals through a separate transmit antennas 28, 44 and 46. The rebroadcast ranging signals from the various channels 34, 36 and 38 are transmitted in the same frequency band and distinguished by different spreading codes. The modulators 20 of each channel 34, 36 and 38 apply different spreading codes to uniquely identify the ranging signals despite transmission with different antennas in a same or overlapping frequency band. Different frequencies may be used in other embodiments. While the number of channels 34, 36 and 38 shown is three, any useful number of transmit antennas 28, 44 and 46 using the same or different number of channels 34, 36 and 38 may be used. Multiple transmit antennas in a single synchrolite are valuable for the same reasons that multiple antennas connected to a single navigation receiver are valuable, as discussed above in the description of FIG. 3.

Although FIG. 4 shows a synchrolite which rebroadcasts only the L1 frequency band of the American GPS system, any or all of the frequency bands discussed herein may be used. In this case, the receive antenna 12 could receive multiple frequency bands, and the corresponding synchrolite channel 34, 36 and 38 would be replaced by a multiple-band synchrolite of the type shown in FIG. 2. Similarly, a single synchrolite may use multiple receive and multiple transmit antennas, such as for rebroadcasting ranging signals received in multiple bands through any or all of the receive antennas. Any combination of the systems of FIGS. 1-4 may be used. Furthermore, it may prove convenient for a given synchrolite to transmit the rebroadcast signals in more than one frequency band.

In a method of operation, FIG. 4 represents receiving the ranging signals in a first frequency band, modulating the ranging signals with at least two different spreading codes, and separately transmitting the modulated ranging signals for each of the at least two different spreading codes from separate antennas. The separate transmission is simultaneous, but may be sequential. The transmissions from each of the antennas are at a same frequency band, but different or overlapping frequency bands may be used.

In an alternate embodiment, any combination of the synchrolite channels within a given synchrolite may transmit their rebroadcast signals in an interrupted or pulsed manner rather than continuously. This may be useful in reducing interference between synchrolites or between channels within a given synchrolite. Different channels may have the same or different components.

In yet another alternate embodiment, any synchrolite channel may rebroadcast signals from any useful band, including but not limited to navigation signals, such as the signals transmitted by GNSS systems (GPS, Glonass, Galileo, etc), by GNSS augmentation systems (WAAS, LAAS, EGNOS, etc), by other synchrolites, by pseudolites, or by other radio navigation systems (Loran, VOR, TACAN, ILS, MLS, ADF beacons, marine radio beacons, etc). A synchrolite channel may alternatively rebroadcast signals from other systems not originally intended for navigation, such as satellite broadcasting, satellite communications, terrestrial broadcasting, and terrestrial communications. In other alternate embodiments, the pilot tones transmitted by various synchrolites or synchrolite channels within a given system may be adjusted to be on substantially the same frequency, to be on differing frequencies within the common rebroadcasting band, or even to be slightly outside the rebroadcasting band. Similarly, the rebroadcast signal bands themselves may be adjusted to fall on substantially the same set of frequencies, on slightly different frequencies, or on adjacent or non-overlapping frequencies within the same overall transmission band.

In another alternate embodiment, the pilot tones of one or more synchrolite channels may be modulated with arbitrary data to be communicated from the synchrolite to the navigation receiver, provided that the data modulation is applied in a way which presents a low or acceptable level of interference to the signal recovery process within the navigation receiver. For example, the data is modulated on the pilot tone using BPSK modulation and timed so that a new data bit is presented to the data modulator at precisely the time that the spreading code generator restarts at the beginning of the spreading code pattern.

FIG. 5 shows a system 50 for receiving rebroadcast ranging signals, such as a navigation receiver. The system 50 includes a channel 52 of a navigation receiver to receive and process signals from a single channel of a rebroadcast synchrolite, such as the one shown in FIG. 1. The system 50 includes a receive antenna 54, a receive amplifier and/or filter 56, a frequency translator 58, a modulator 60, a spreading code tracker 62, a pair of amplifiers and/or filters 64, 66, a GNSS receiver 68, a pilot tone detector 70, a navigation computer 72, a frequency synthesizer 74 and an oscillator 76. Additional, different or fewer components may be provided.

The receive antenna 54 is a patch antenna, microwave antenna, or other now known or later developed antenna for ranging signals. Ranging signals rebroadcast by one or more synchrolite channels are received by the receive antenna 54.

The amplifier and/or filter 56 are a low-noise amplifier and a separate filter appropriate for the frequencies of interest, such as the rebroadcast frequency. Amplification without filtering or filtering without amplification may be used. Other amplifiers and/or filters may be used. The received rebroadcast signals are amplified and/or filtered by the receive amplifier and/or filter 54.

The frequency translator 58 is a mixer or multiplier. In one embodiment, the frequency translator 58 is a diode-ring mixer, but other now known or later developed frequency translators may be used. The frequency translator 58 is operable to shift in frequency the rebroadcast signals from the receive antenna 54. The rebroadcast signals are shifted in frequency to any convenient intermediate frequency band, such as a band 200 MHz wide centered on 1400 MHz, using a local oscillator signal. In a simplified embodiment, the frequency translator may be omitted, making the intermediate frequency band within the receive channel 52 the received frequency band.

The despreading demodulator 60 is a mixer, multiplier, a diode-ring mixer or other now known or later developed demodulator. In one embodiment, the demodulator 60 is a digital demodulator, such as a binary phase shift keying (BPSK) demodulator, quadrature phase shift keying (QPSK) demodulator, m-phase shift keying (mPSK), or quadrature amplitude demodulator (QAM). The demodulator 60 connects with the receive antenna 54 to demodulate the rebroadcast signals as a function of the spreading code used to modulate the signals. The spreading code which was applied to the synchrolite signal by the spreading modulator 20 in FIG. 1 is removed from the intermediate frequency band rebroadcast signals by the despreading modulator 60 using the reconstructed spreading code.

The spreading code tracker 62 is a combination of one or more linear feedback shift registers (LFSR) and each code "chip" is a set of one or more digital bits. Other configurations of components or a single register may be used. The "C/A-code" and "P-code" trackers used in the American GPS system are examples of one type of spreading code tracker 62 in which each code chip is a single digital bit and the spreading code demodulator 60 is a BPSK demodulator. In one embodiment, the spreading code tracker 62 is a field-programmable gate array. The spreading code tracker 62 performs a function similar to the spreading code generator 20 in FIG. 1, computing a new state or "chip" of the spreading code at each transition of the spreading code clock signal. Rather than resetting periodically, the spreading code tracker 62 is shifted forward or held back a fraction of a chip at a time by the spreading code adjust signal generated by the navigation computer 72.

In one embodiment, the pilot tone amplifier and/or filter 66 and detector 70 generate the error signals to adjust the timing of the reconstructed spreading code so that the code matches the timing of the transmitted spreading code. The pilot tone is detected once the two codes are approximately aligned. The alignment may be improved by adjusting the timing to maximize the amplitude of the detected pilot tone, or by delay-locked-loop techniques. In this embodiment, the navigation computer 72 searches in one dimension (i.e., the timing of the reconstructed spreading code) to find the synchrolite signal.

As noted in the discussion of FIG. 1, an alternate embodiment of the synchrolite channel may omit the generation of the pilot tone. The corresponding embodiment of FIG. 5 may omit the detection of the pilot tone (components 66 and 70). In this embodiment, the navigation computer 72 uses the signal strength of one or more GNSS signals, as reported by the GNSS receiver 68, to detect and refine the alignment of the reconstructed spreading code. The GNSS receiver 68 report no or minimal signal strength for a given rebroadcast signal unless the reconstructed spreading code for that signal is aligned with the spreading code transmitted by the synchrolite. The navigation computer 72 searches in two dimensions, the timing of the reconstructed synchrolite spreading code and the timing of the reconstructed spreading code of the ranging signal. Both dimensions of the search align before any significant signal strength is detected and before the timing of either reconstructed code may be improved. If the navigation receiver 50 contains an independent GNSS receiver 68, and the synchrolite is known to be within a certain radius (equivalent to n GNSS code chips) of the navigation receiver 50, then the correct timing of the ranging signals rebroadcast by the synchrolite may be found to lie with the range of 0 to 2n GNSS code chips later than the timing of the GNSS code received directly by the independent GNSS receiver 68. The navigation computer 72 uses this information to restrict the second dimension of the search to the known range, thus reducing the time required for the entire search.

The pair of amplifiers and/or filters 64 and 66 connects with the despreading demodulator 60. One filter 66 is operable to isolate a pilot signal from the output of the despreading demodulator 60. This pilot tone amplifier and/or filter 66 filters the despread intermediate frequency band to remove signals except for a narrow band around the likely frequency of the desired pilot tone. The other filter 64 is operable to filter the despread intermediate frequency band to the bandwidth of the desired ranging signal, and amplify the ranging signal.

The pilot tone detector 70 is an envelope detector or phase-locked loop, which may be implemented using analog or digital circuits. The pilot tone detector 70 measures the amplitude and/or frequency of the pilot tone received from the synchrolite.

The navigation computer 72 is a processor, microprocessor, digital signal processor, analog circuit, digital circuit, application specific integrated circuit or other now known or later developed processor with software for controlling or determining a range or a position from a plurality of ranges. The navigation computer 72 uses the pilot tone information to adjust the timing of the reconstructed spreading code generated by the spreading code tracker 62 so that the reconstructed spreading code is synchronized with the spreading code transmitted by the synchrolite channel. The method for synchronizing the transmitted and reconstructed spreading codes is analogous to the method for tracking spread-spectrum GNSS signals spread by analogous code.

The ranging signal receiver 68 is any now known or later developed ranging signal receiver, such as a GPS receiver for operating on CDMA ranging signals. The ranging signal receiver 68 connects with an output of the despreading demodulator 60 and is operable to despread an input signal to determine a range. The receiver 68 attempts to track the ranging signals embedded within the input frequency band.

Once the transmitted and reconstructed spreading codes have been synchronized, the input to the receiver 68 closely resembles the ranging signals received by the synchrolite channel's receive antenna 12 (see FIG. 1). Some differences may exist. The signals may be delayed in passing through the electronics of the synchrolite channel 34, and further delayed in crossing the space between the synchrolite channel's transmit antenna 28 and the navigation receiver's receive antenna 54, and still further delayed in passing through the electronics of the navigation receiver's channel 52 up to the GNSS receiver 68. The signals may be weaker or noisier due to imperfect alignment between the transmitted and reconstructed spreading codes. The signals may be weaker or noisier and may contain additional multipath reflections due to its passage through the electronics of the synchrolite channel 34 and through the space between the synchrolite and the navigation receiver 50. The GNSS receiver 68 operates with these differences in mind, such as providing a noise filter or algorithm, increasing amplification, adjusting a phase of the alignment, measuring the signals at several slightly different alignments, and other techniques now known or yet to be developed. The GNSS receiver 68 may also processes an input band of frequencies which may be far from the original GNSS signal frequencies, depending on the frequencies chosen for the three local oscillator signals (i.e., the mixing frequency of the frequency translators 16, 24 and 58. In systems in which the synchrolite reflects signals other than GNSS signals, the GNSS receiver 68 may be replaced by a receiver for the reflected signals.

The reference oscillator 76 is a crystal oscillator, such as an ovenized crystal oscillator. Other now known or later developed oscillators may be used. The reference oscillator 76 generates a signal at any reference frequency, such as 10.000 MHz. The oscillating output of the oscillator 76 is provided to the frequency synthesizer 74 for use by the channel 52. Separate oscillators are used in other embodiments.

The frequency synthesizer 74 is a group of phase-locked-loop oscillator modules, but other frequency dividers or multipliers may be used. The frequency synthesizer 74 generates the local oscillator signal at different frequencies for the frequency translator 58, the clock for the spreading code tracker 62 and/or any additional local oscillator or clock signals used by the GNSS receiver 68, navigation computer 72 or pilot tone detector 70. The reference oscillator 76 and/or the frequency synthesizer 74 are common to all channels 52 within a given synchrolite receiver, but separate devices may be used for different channels or within a same channel 52.

The bandwidth of the channel 52, including the received signals, the various intermediate frequency signals, and the input to the GNSS receiver 68, is wide enough to convey all or substantially all of the signals transmitted by ranging systems, such as 20 MHz or another range. The bandwidth of the signal path from the receive antenna 54 through the spreading demodulator 60 is wide enough to convey a substantial portion of the spread combined intermediate frequency signal, such as 200 MHz or another range. The bandwidth is wide enough to reliably despread and recover the various signals in the subsequent components of the synchrolite receiver channel 52.

FIG. 5 also represents a method for receiving rebroadcast ranging signals that uses the same or different components than discussed above. A rebroadcast spread spectrum ranging signal is received. The ranging signal is spread for rebroadcast, spread as originally broadcast, or both. The spread spectrum ranging signal is despread as a function of a spreading code. A pilot tone may be isolated from the ranging signals after being despread based on the code used for rebroadcasting. In a feedback, the pilot tone is used to refine the despreading operation for subsequent ranging signals. Where the ranging signal includes two different spreads, such as associated with an original CDMA ranging signal being rebroadcast with another spreading code, the output of the act of despreading is despread further as a function of another spreading code. A range is determined from the despread ranging signals.

Figure 6:
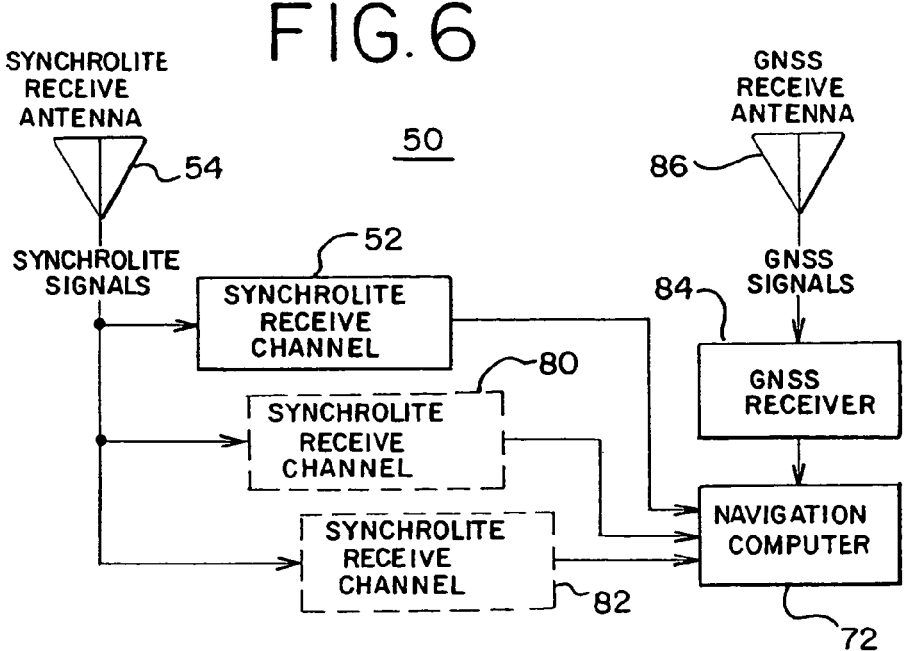
FIG. 6 is a block diagram of another embodiment of a ranging receiver for receiving rebroadcast signals from one or more synchrolites.

In one embodiment, multiple channels 52 of the receive or navigation system 50 are provided. For example, multiple despreading demodulators connect with the same or different receive antennas 54 and operate in response to different despreading codes to uniquely identify different ranging signals. FIG. 6 shows one embodiment of a navigation receiver 50 intended to receive and process signals from one or more of the rebroadcasting synchrolites discussed herein. Three receive channels 52, 80 and 82 are shown, but fewer or greater number may be used. Each of the receive channels 52, 80 and 82 is the same or similar to the single receive channel 52 described above for FIG. 5. Each receive channel 52, 80 and 82 is operable to receive signals from one synchrolite channel 34 shown in FIGS. 1-4. For simultaneous processing or reception from multiple rebroadcasting channels 34, 36 and/or 38, a respective multiple receive channels 52, 80 and/or 82 are provided. For example, a navigation receiver 50 with six synchrolite receive channels may process signals from six single-channel synchrolites 10 (FIG. 1) or two three-channel synchrolites (FIGS. 2-4) simultaneously. A memory for sequential processing is alternatively provided.

Optionally, a GNSS antenna 86 and associated receiver 84 connect with the navigation computer 72. The GNSS receiver 84 allows the navigation computer 72 to make differential measurements between the positions of the synchrolite channels 52, 80 and 82 and the position of the GNSS receiver 84. The reference oscillator 76 and frequency synthesizer 74 may be shared between the synchrolite receiver channels 50, 80 and 82 and the GNSS receiver 84. The GNSS receive antenna 86 and the synchrolite receive antenna 54 are positioned so that the phase centers are aligned as closely as possible, such as being adjacent to each other. The GNSS and synchrolite receive antennas 86 and 54 are constructed so that the GNSS signals appear to be received at virtually the same point in space as the synchrolite signals are received. The instantaneous signal tracking data for each signal measured by the GNSS receiver 84 may be fed forward into the GNSS receivers 68 within each of the receiver channels 52, 80 and 82 to improve the tracking of the equivalent GNSS signal rebroadcast by the synchrolites, which will in general be comparatively noisier. The same principle applies to embodiments in which the signals rebroadcast by the synchrolites are not GNSS signals but are instead signals from other radio systems. In systems in which the synchrolites reflect signals other than GNSS signals, the GNSS antenna and receiver could be replaced or augmented with antennas and receivers for the signals which the synchrolites reflect.

FIG. 6 also represents a method for receive rebroadcast ranging signals using the same or different components than discussed above. The received spread spectrum ranging signal is despread as a function of different spreading codes for each channel. The resulting ranging signals originally receive by the synchrolite channels are then further despread by codes corresponding to the ranging signals, such as GPS codes. The range is determined as a function of the despread ranging signals, such as through alignment of codes with or without differential measurements. The algorithms for relative navigation or determining range using synchrolites and/or GNSS signals are altered to account for signal delays through the synchrolites, generally by subtracting those delays from the measured ranges. The signal delays can be measured in real-time by the synchrolite itself or a separate reference receiver, calibrated at the factory or periodically in the field, or simply assumed as a constant valid for all copies of a given synchrolite configuration.

As one possible example of a system corresponding to FIG. 1, the reference oscillator 32 is an ovenized crystal oscillator such as the Milliren 230-0503; the frequency synthesizer 30 is a group of phase-locked-loop oscillator modules such as the PSN1810A, PSN2710A, and PSN0210A from Z-Comm; the spreading code generator 22 is a field-programmable gate array such as the Xilinx XC2S50; the receive antenna 12 is a GPS antenna such as the Andrew 40 series; the receive amplifier/filter 14 is a low-noise amplifier such as the MIA-Com MAAM12021 and a filter such as the Toko 4DFB-1575D-10; the frequency translators 16 and 24 and the spreading modulator 20 are diode-ring mixers such as the Mini-Circuits SYM-2500; the signal combiner 18 is a microstrip quadrature hybrid; the transmit amplifier/filter 26 is a medium-power amplifier such as the Mini-Circuits GALI-5 and a filter such as the Toko 4DFB-2450T-10; and the transmit antenna 28 is a patch antenna such as the Toko DACT2450CT1T. A microcontroller, such as the Motorola 9S12DP256, may be used to program the Z-Comm PLL modules and initialize the Xilinx FPGA.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for rebroadcasting ranging signals for use in navigation, the method comprising:
   (a) receiving one or more ranging signals at an antenna, the ranging signals being code division multiplexed signals;
   (b) modulating the code division multiplexed ranging signals as received in step (a) with a spreading code, the modulated code division multiplexed signals being spread by the spreading code; and
   (c) transmitting the ranging signals as modulated in step (b).

2. The method of claim 1 further comprising:
   (d) determining a range from each of the signals transmitted in (c) by despreading twice in sequence.

3. The method of claim 2 further comprising:
   (e) determining a position as a function of time from a group of ranges determined in (d).

4. The method of claim 1 further comprising: (d) frequency shifting the ranging signals after (a) and prior to (c).

5. The method of claim 1 wherein (a) comprises receiving ranging signals in at least one frequency band.

6. A method for rebroadcasting ranging signals for use in navigation, the method comprising:
   (a) receiving therefore ranging signals at an antenna;
   (b) modulating the ranging signals as received in step (a) with a spreading code; and
   (c) transmitting the ranging signals as modulated in step (b); wherein (a) comprises receiving ranging signals in at least two frequency bands and wherein (b) comprises modulating the ranging signals of each frequency band with a different spreading code.

7. The method of claim 6 further comprising:
   (d) shifting the ranging signals of the at least two frequency bands to a single rebroadcast frequency band;
   wherein (c) comprises transmitting at the rebroadcast frequency band, the transmitted signals corresponding to the ranging signals from each of the at least two frequency bands.

8. The method of claim 1 further comprising:
   (d) combining the ranging signals with a pilot tone prior to (b).

9. The method of claim 8 further comprising:
   (e) modulating the pilot tone prior to (d).

10. The method of claim 1 wherein (a) comprises receiving the ranging signals from a satellite selected from the group of: a GNSS satellite and a satellitebased GNSS augmentation service.

11. The method of claim 1 wherein (a) comprises receiving the ranging signals from a land-based transmitter.

12. The method of claim 1 wherein (c) comprises intermittently transmitting.

13. A method for rebroadcasting ranging signals for use in navigation, the method comprising:
   (a) receiving one or more ranging signals at an antenna;
   (b) modulating the ranging signals as received in step (a) with a spreading code; and
   (c) transmitting the ranging signals as modulated in step (b); wherein (a) comprises receiving the ranging signals with a plurality of receive antennas, the antenna being one of the plurality of antennas, wherein (b) comprises modulating the ranging signals of each of the plurality of receive antennas with a different spreading code, and wherein (c) comprises combining the plurality of modulated signals from step (b) and transmitting them through a single antenna.

14. The method of claim 13 wherein (a) comprises receiving the ranging signals at a same frequency band at each of the plurality of receive antennas;
further comprising:
(d) shifting the ranging signals to a rebroadcast frequency band;
wherein (c) comprises transmitting at the rebroadcast frequency band the modulated ranging signals for each receive antenna simultaneously.

15. The method of claim 1 wherein (a) comprises receiving the ranging signals in a first frequency band, wherein (b) comprises modulating the ranging signals with at least two different spreading codes, and wherein (c) comprises separately transmitting the modulated ranging signals for each of the at least two different spreading codes.

16. The method of claim 15 wherein (c) comprises simultaneously transmitting the modulated ranging signals from separate antennas, each of the modulated ranging signals having a substantially same frequency band.

17. The method of claim 4 further comprising:
(d) calibrating the shifting as a function of the ranging signals received in (a).

18. A system for rebroadcasting ranging signals for use in navigation, the system comprising:
a first receive antenna to receive ranging signals operable for navigation, the ranging signals being spread spectrum signals;
a first modulator connected with the first receive antenna, the first modulator operable to modulate the spread spectrum ranging signals from the first receive antenna with a first spreading code, the modulated spread spectrum ranging signals being spread signals spread again by the spreading code; and
a first transmit antenna connected with an output of the modulator.

19. The system of claim 18 further comprising:
a mixer connected with the first modulator, the mixer operable to frequency shift the signals from the first receive antenna.

20. A system for rebroadcasting ranging signals for use in navigation, the system comprising:
a first receive antenna to receive ranging signals operable for navigation;
a first modulator connected with the first receive antenna, the first modulator operable to modulate the ranging signals from the first receive antenna with a first spreading code; and a first transmit antenna connected with an output of the modulator;
wherein the first modulator is operable on the signals from the first receive antenna at a first frequency band;
further comprising:
a second modulator operable on other signals at a second frequency band different than the first frequency band, the second modulator operable to modulate the other signals with a different spreading code than for the first modulator;
wherein the first transmit antenna is operable to simultaneously transmit the signals and other signals from the first and second modulators.

21. A system for rebroadcasting ranging signals for use in navigation, the system comprising:
a first receive antenna to receive ranging signals operable for navigation;
a first modulator connected with the first receive antenna, the first modulator operable to modulate the ranging signals from the first receive antenna with a first spreading code; and a first transmit antenna connected with an output of the modulator;
wherein the first modulator is operable on the signals at a first frequency band;
further comprising:
a second receive antenna; and
a second modulator connected with the second receive antenna, the second modulator operable on signals from the second receive antenna at the first frequency band and operable to modulate the signals from the second receive antenna with a different spreading code than for the first modulator;
wherein the first transmit antenna is operable to simultaneously transmit signals from the first and second modulators.

22. A system for rebroadcasting ranging signals for use in navigation, the system comprising:
a first receive antenna to receive ranging signals operable for navigation;
a first modulator connected with the first receive antenna, the first modulator operable to modulate the ranging signals from the first receive antenna with a first spreading code; and
a first transmit antenna connected with an output of the modulator;
wherein the first modulator is operable on signals at a first frequency band;
further comprising:
a second modulator operable to modulate the signals as a function of a second spreading code different than the first spreading code; and
a second transmit antenna connected with the second modulator, the second transmit antenna operable to transmit the signals modulated by the second modulator and the first transmit antenna operable to transmit the signals modulated by the first modulator.

23. The system of claim 18 further comprising:
a signal combiner connected between the first receive antenna and the modulator, the signal combiner operable to combine the signals with a pilot tone.

* * * * *